(12) United States Patent
Lien (10) Patent No.: US 8,730,537 B2
(45) Date of Patent: May 20, 2014

(54) DUPLEX SCANNING APPARATUS WITH ELASTIC PRESSING MEMBER DISPOSED BETWEEN TWO SCAN POSITIONS

(75) Inventor: Szu Hui Lien, Hsinchu (TW)

(73) Assignee: Avision Inc. (TW)

( * ) Notice: Subject to any disclaimer, the term of this patent is extended or adjusted under 35 U.S.C. 154(b) by 251 days.

(21) Appl. No.: 13/313,599

(22) Filed: Dec. 7, 2011

(65) Prior Publication Data

US 2012/0147441 A1    Jun. 14, 2012

(30) Foreign Application Priority Data

Dec. 10, 2010   (TW) ................................ 99143218 A (51) Int. Cl.
*H04N 1/04*    (2006.01)

(52) U.S. Cl.
USPC ........... 358/496; 358/408; 358/474; 358/498; 358/461; 399/364; 399/374; 355/23; 355/24

(58) Field of Classification Search
CPC .............. H04N 1/193; H04N 1/00095; H04N 1/00132; H04N 1/00249; H04N 1/401; H04N 1/4076; H04N 2201/0424; H04N 2201/00042; H04N 1/12; H04N 1/0057; H04N 1/121; H04N 2201/00631; H04N 2201/00619; G02B 17/0663

USPC .......... 358/498, 496, 408, 474, 461; 399/364, 399/374; 355/23, 24; 382/318, 319, 312, 382/274

See application file for complete search history.

(56) References Cited

U.S. PATENT DOCUMENTS

| 5,826,133 | A * | 10/1998 | Saito et al. ........................ 399/2 |
| 7,110,148 | B2 * | 9/2006 | Hasegawa et al. ............ 358/474 |
| 7,391,538 | B2 * | 6/2008 | Lien ................................. 358/461 |
| 7,920,307 | B2 * | 4/2011 | Sheng et al. .................. 358/498 |
| 8,208,182 | B2 * | 6/2012 | Han ............................... 358/496 |
| 2007/0216976 | A1 * | 9/2007 | Endo et al. ........................ 359/2 |

* cited by examiner

*Primary Examiner* — Cheukfan Lee (57) ABSTRACT

A duplex scanning apparatus includes a passageway, a first optical module, a second optical module, a transporting mechanism and an elastic pressing member. The first optical module is disposed on one side of the passageway. The second optical module is disposed on the other side of the passageway. The transporting mechanism transports an original sheet through the passageway and past a first scan position of the first optical module and a second scan position of the second optical module, and images of front and reverse sides of the original sheet are obtained, respectively. The elastic pressing member, disposed between the first scan position and the second scan position, pushes the original sheet towards an original supporting plane.

12 Claims, 7 Drawing Sheets

DUPLEX SCANNING APPARATUS WITH ELASTIC PRESSING MEMBER DISPOSED BETWEEN TWO SCAN POSITIONS

This application claims priority of No. 099143218 filed in Taiwan R.O.C. on Dec. 10, 2010 under 35 USC 119, the entire content of which is hereby incorporated by reference.

BACKGROUND OF THE INVENTION

1. Field of the Invention

The present invention relates to a duplex scanning apparatus, and more particularly to a duplex scanning apparatus with an elastic pressing member disposed between two scan positions, for enhancing the overall scan quality.

2. Related Art

In a conventional duplex scanning apparatus using either a charge-coupled device (CCD) type image sensor scanning module or a contact type image sensor (CIS) scanning module, two transparent glass sheets for the purposes of defining a scan region and a passageway and separating a paper sheet from the scanning module have to be disposed on the paper transporting path. Even if the passageway is configured to have an adjustable clearance, it still has to maintain certain space to allow original sheets to pass through smoothly without paper jam occurrence. Since the original sheets to be scanned have various thicknesses, the sheet passageway cannot be configured to be too narrow, or otherwise the thicker original sheets, such as a business card, a magnetic card, a chip card and etc, cannot enter and pass the scan region smoothly. For a thin sheet, such as a receipt, letter, and etc., however, the movement of the thin sheet produces vertical deflections if the sheet passageway is configured to be wide. More particularly, when the CIS scanning module is adopted, image distortion will occur due to any unevenness or curling of the document sheet.

SUMMARY OF THE INVENTION

Accordingly, the present invention has been proposed to solve the problems of the prior art, and it is an object of the present invention to provide a duplex scanning apparatus which has an elastic pressing member disposed between two scan positions and which aims to scan original sheets of various thicknesses and enhance the scan quality by pressing the scan documents with the elastic pressing member.

To achieve the above-identified object, the present invention provides a duplex scanning apparatus including a passageway, a first optical module, a second optical module, a transporting mechanism and an elastic pressing member. The first optical module is disposed on one side of the passageway. The second optical module is disposed on the other side of the passageway. The transporting mechanism transports an original sheet through the passageway and past a first scan position of the first optical module and a second scan position of the second optical module, such that an image of a front side of the original sheet and an image of a reverse side of the original sheet are obtained. The elastic pressing member, disposed between the first scan position and the second scan position, pushes the original sheet towards an original supporting plane.

In the duplex scanning apparatus, the original sheet can be stably transported past the first scan position and second scan position without significant vertical deflection.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

Figure 1:
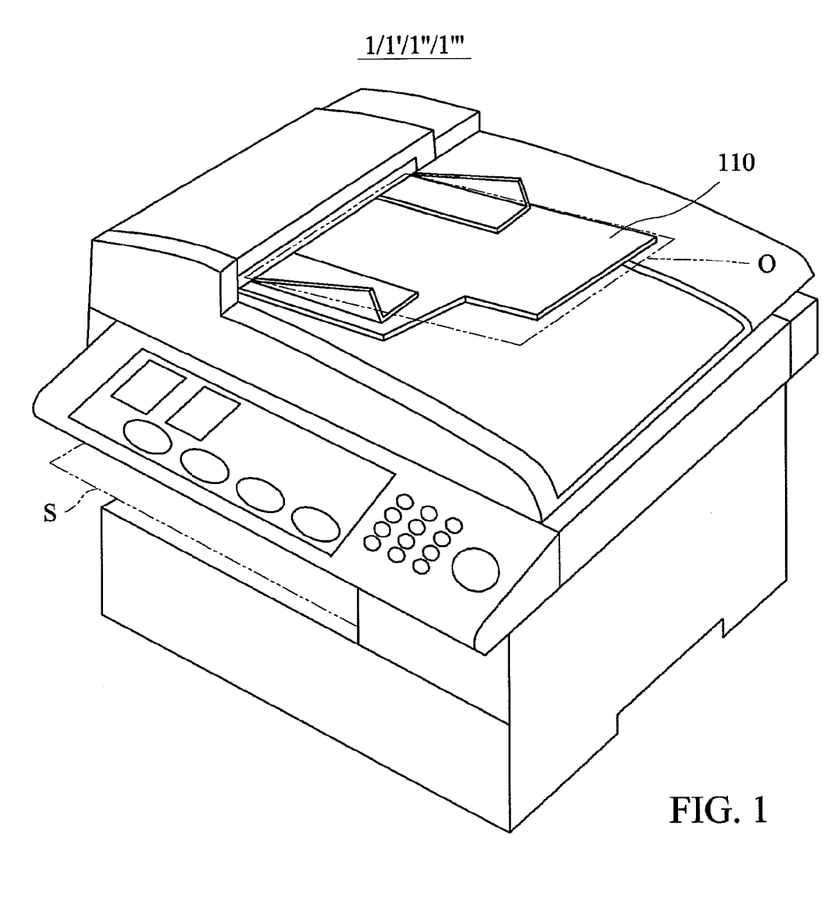
FIG. 1 is a pictorial view of a duplex scanning apparatus according to the present invention.

FIG. 1 is a pictorial view of a duplex scanning apparatus 1/1'/1"/1''' according to the present invention. As shown in FIG. 1, the duplex scanning apparatus 1/1'/1"/1''' of the present invention is a multi-function printer. The multi-function printer scans in a scan region the two sides of an original sheet O transported from a supply tray 110 and prints out the scan results on a sheet S or outputs the scan results to an external data processing or storage apparatus.

Figure 2:
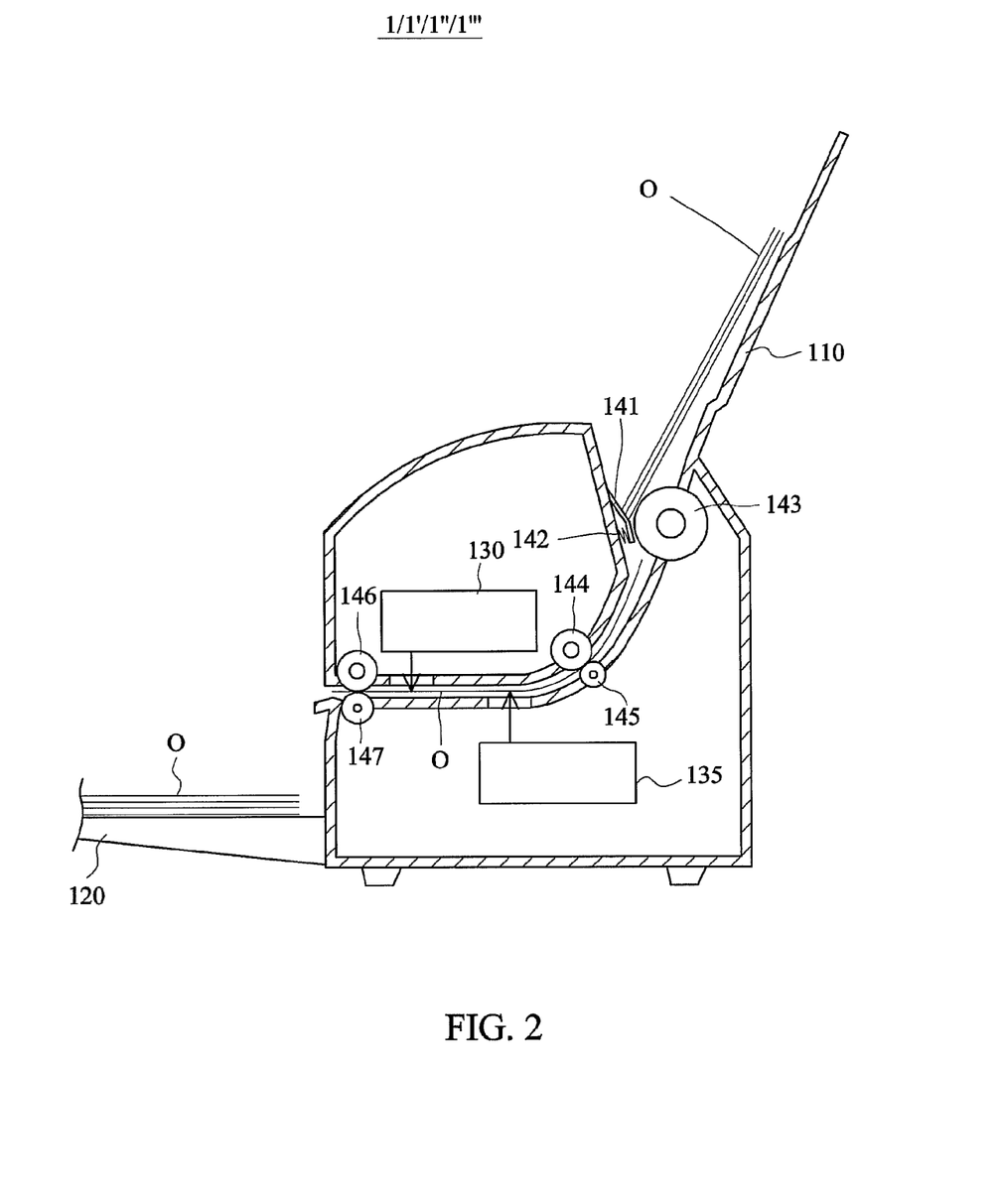
FIG. 2 is a schematic illustration of another duplex scanning apparatus according to the present invention.

FIG. 2 is a schematic illustration of another duplex scanning apparatus according to the present invention. As shown in FIG. 2, the duplex scanning apparatus 1/1'/1"/1''' of the present invention is a sheet-fed duplex scanner comprising a sheet-input roller 143, a frictional element 141, a biasing spring 142, two scanning modules 130, 135, and transporting rollers 144, 145, 146, 147. By using these components, the sheet-fed duplex scanner transports the original sheet O from the supply tray 110, past a scan line and finally to a discharge tray 120. The two scanning modules 130, 135 scan either side of the original sheet O.

Figure 3:
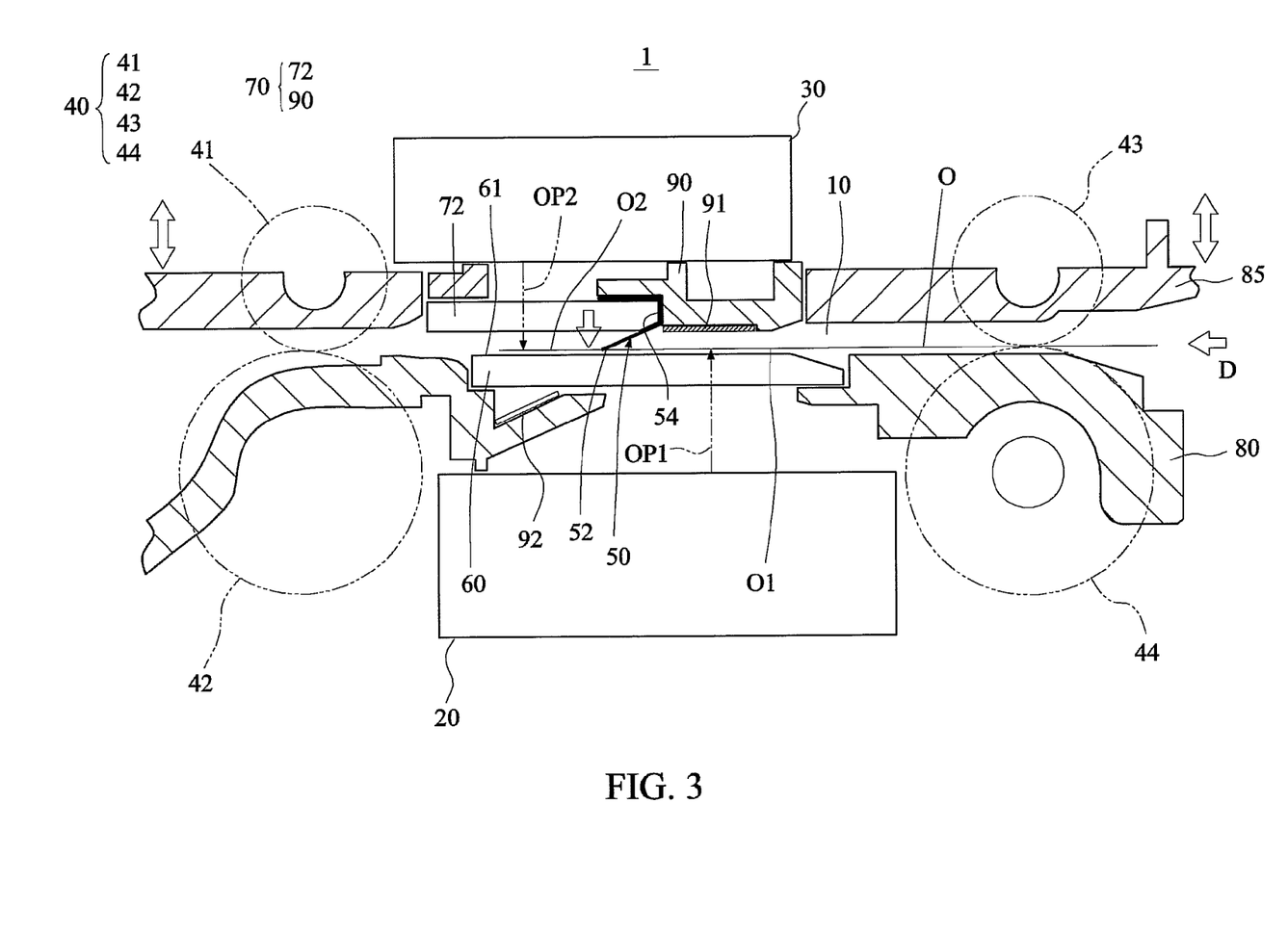
FIG. 3 is a partial view of the duplex scanning apparatus according to a first embodiment of the present invention.

FIG. 3 is a partial view of the duplex scanning apparatus 1 according to a first embodiment of the present invention. Referring to FIG. 3, the duplex scanning apparatus 1 of this embodiment includes a passageway 10, a first optical module 20, a second optical module 30, a transporting mechanism 40 and an elastic pressing member 50. Each of the first optical module 20 and the second optical module 30 include a charge-coupled device (CCD) type image sensor or a contact type image sensor (CIS).

The first optical module 20 is disposed on one side of the passageway 10. The second optical module 30 is disposed on the other side of the passageway 10. The transporting mechanism 40, including transporting rollers 41, 42, 43 and 44, transports the original sheet O through the passageway 10 and past a first scan position OP1 of the first optical module 20 where the first optical module 20 captures an image of a front side O1 of the original sheet O. The transporting mechanism 40 transports the original sheet O past a second scan position OP2 of the second optical module 30 where the second optical module 30 captures an image of a reverse side O2 of the original sheet O.

The elastic pressing member 50, disposed between the first scan position OP1 and the second scan position OP2, pushes the original sheet O towards an original supporting plane 61. In this embodiment, the elastic pressing member 50 is an elastic sheet. However, the present invention is not particularly restricted thereto, and the elastic pressing member 50 may be a rubber roller, a foam member and etc.

In addition, the duplex scanning apparatus 1 further includes a first transparent substrate 60, a guiding structure 70, a first body 80 and a second body 85. The first body 80 and the second body 85 are moved (translated or rotated) relatively to each other such that the clearance width of the passageway 10 is changed. The first optical module 20 is disposed in the first body 80, and the second optical module 30 is disposed in the second body 85.

The original supporting plane 61 is formed by an upper surface of the first transparent substrate 60, and the elastic pressing member 50 presses the original sheet O against the first transparent substrate 60. Thus, the original sheet O is stably moved forward along the original supporting plane 61 when being transported past the first scan position OP1 and the second scan position OP2. In this embodiment, the guiding structure 70 includes a second transparent substrate 72 and a calibration sheet carrier 90, which is disposed at the first scan position OP1 and fixed to the second body 85. A first calibration sheet 91 is disposed on a bottom side of the calibration sheet carrier 90. Thus, the first optical module 20 can capture an image of the first calibration sheet 91 which serves as reference for calibrating an image sensor of the first optical module 20 and compensating an image signal therefrom. On the other hand, a second calibration sheet 92 is disposed at the second scan position OP2 and on the first body 80 such that the second optical module 30 can capture the image of the second calibration sheet 92 as the reference for calibrating an image sensor of the second optical module 30 and compensating the image signal therefrom.

The guiding structure 70 is disposed on one of the two sides of the passageway 10, such as a top side or a bottom side. In FIG. 3, the guiding structure 70 is disposed on the top side of the passageway 10, and the original supporting plane 61 is disposed opposite to the guiding structure 70. A fixed end portion 54 of the elastic pressing member 50 is mounted between the second transparent substrate 72 and an adapter 74 of the guiding structure 70. The fixed end portion 54 is disposed between the first scan position OP1 and the second scan position OP2. The original sheet O enters the scan region in a transporting direction D. The front end of the original sheet O, transported past the first scan position OP1, reaches the second scan position OP2 after it is transported past the elastic pressing member 50. When the front end of the original sheet O abuts against a free end portion 52 of the elastic pressing member 50, the front end of the original sheet O, which tends to tilt upward, is suppressed by the free end portion 52 and moved in contact with the first transparent substrate 60. By such, the original sheet O, when being transported past the first scan position OP1 and the second scan position OP2, is placed closely to or on the first transparent substrate 60. If the elastic pressing member 50 is not disposed between the first scan position OP1 and the second scan position OP2, the front end of the original sheet O tends to deviate from the intended path when traveling past the first scan position OP1 and the second scan position OP2, and a scan image with shadows is also generated.

Figure 4:
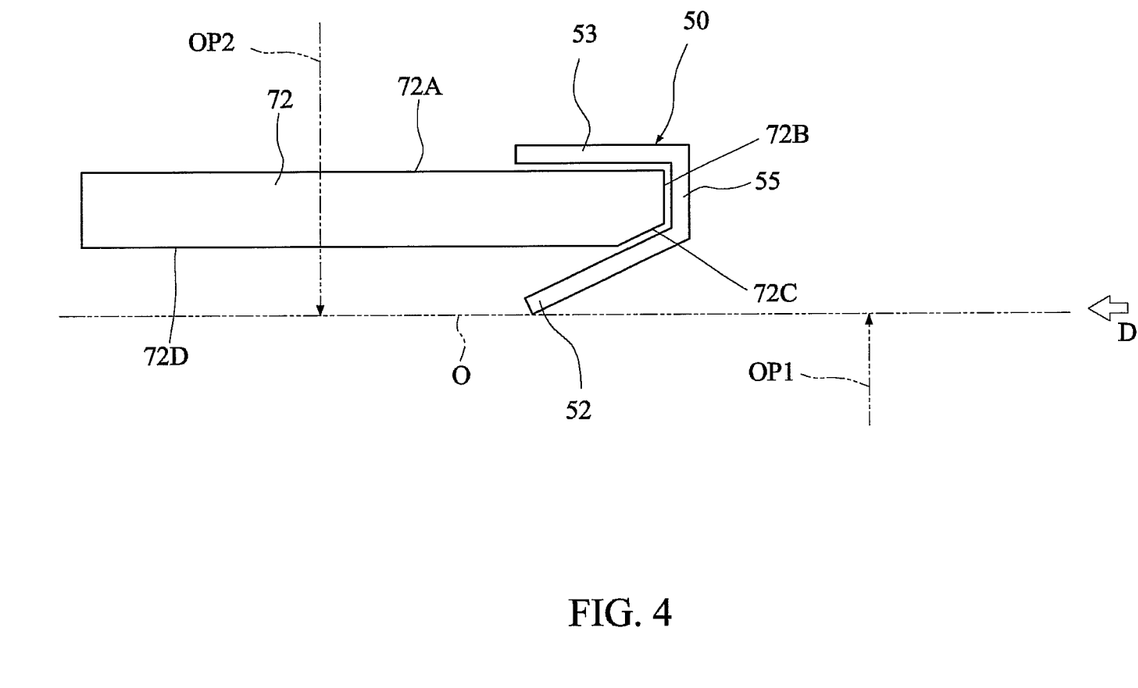
FIG. 4 is an enlarged view of a second transparent substrate and an elastic pressing member according to the first embodiment of the present invention.

FIG. 4 is an enlarged view of the second transparent substrate 72 and the elastic pressing member 50 according to the first embodiment of the present invention. Referring to FIG. 4, the second transparent substrate 72 includes an upper surface 72A and an adjacent side surface 72B connected to upper surface 72A. The side surface 72B is located between the first scan position OP1 and the second scan position OP2. In addition, the second transparent substrate 72 further includes an inclined surface 72C connected to the side surface 72B, and a lower surface 72D connected to the inclined surface 72C. The upper surface 72A is substantially parallel to the lower surface 72D, and the side surface 72B is substantially perpendicular to the upper surface 72A and the lower surface 72D. The elastic pressing member 50 is bent and includes a first section 53, a connected second section 55 and the free end portion 52. The first section 53 is fixed to the upper surface 72A. The second section 55 is fixed to the side surface 72B. The free end portion 52 pushes the original sheet O towards the original supporting plane 61. With the above-mentioned structures, the elastic pressing member 50 is firmly attached to the second transparent substrate 72 and applies a suitable normal force to the original sheet O at a predetermined inclined angle.

Figure 5:
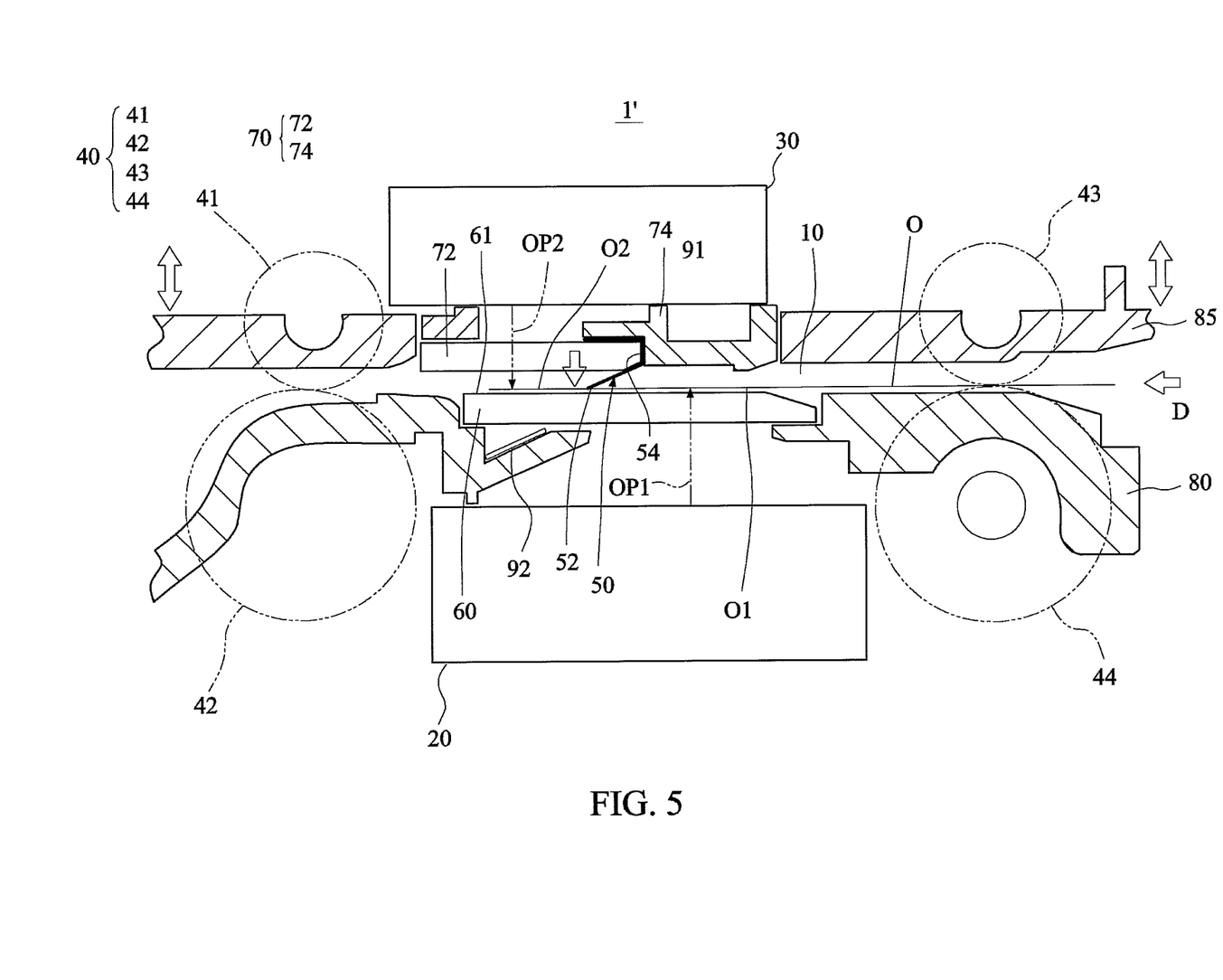
FIG. 5 is a partial view of the duplex scanning apparatus according to a second embodiment of the present invention.

FIG. 5 is a partial view of the duplex scanning apparatus 1' according to a second embodiment of the present invention. The difference between FIGS. 5 and 3 resides in the feature that the duplex scanning apparatus 1' of FIG. 5 has no calibration sheet. The guiding structure 70 includes the second transparent substrate 72 and the adapter 74. The fixed end portion 54 of the elastic pressing member 50 is mounted between the second transparent substrate 72 and the adapter 74.

Figure 6:
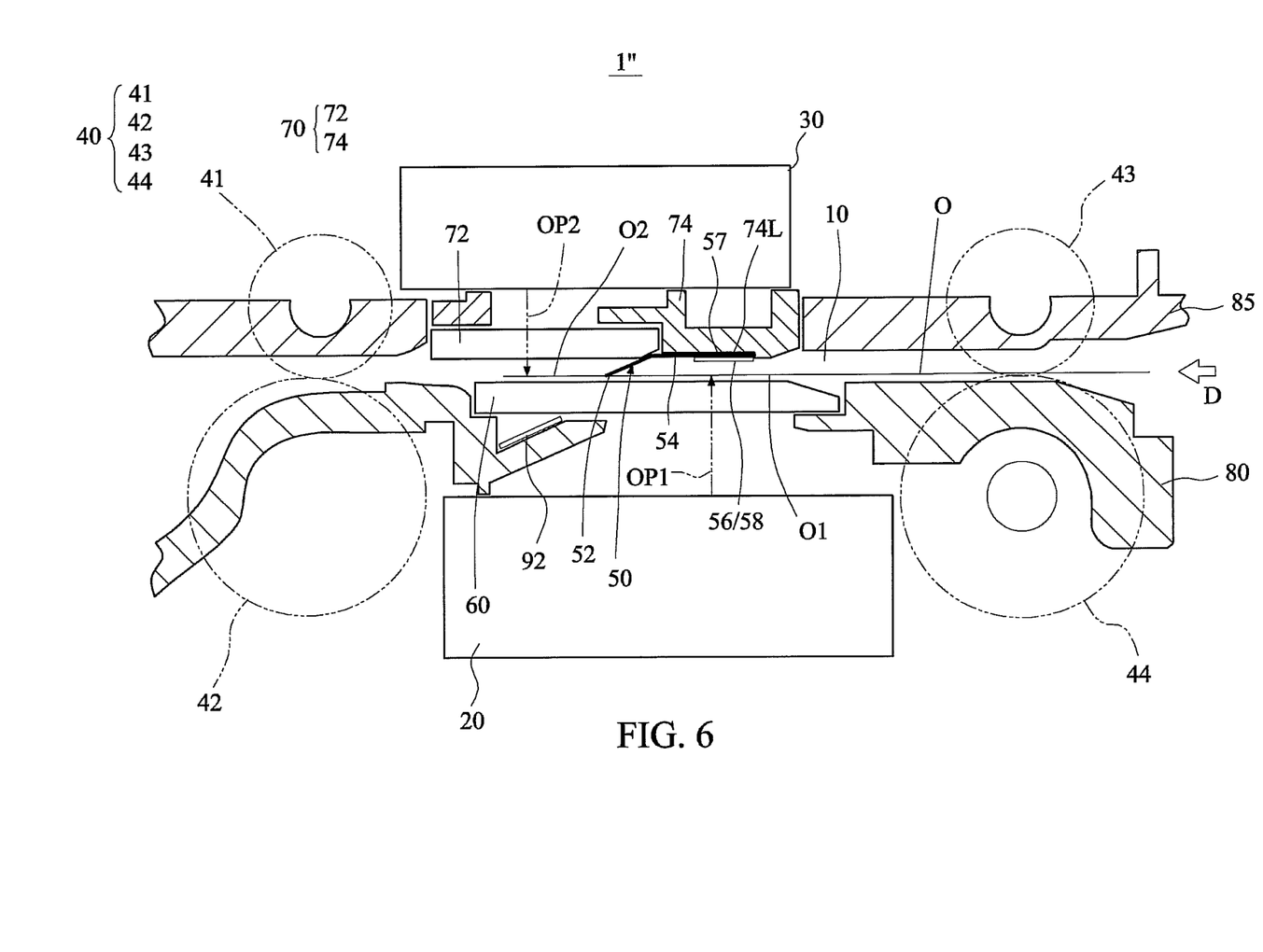
FIG. 6 is a partial view of the duplex scanning apparatus according to a third embodiment of the present invention.

FIG. 6 is a partial view of the duplex scanning apparatus 1" according to a third embodiment of the present invention. As shown in FIG. 6, this embodiment is similar to the first embodiment except that the fixed end portion 54 of the elastic pressing member 50 is mounted on the adapter 74. In this embodiment, the fixed end portion 54 is attached to the adapter 74 at the first scan position OP1 and has an outer plane 56 facing the original supporting plane 61, and the free end portion 52 bends towards the original supporting plane 61. The outer plane 56 of the fixed end portion 54 is formed with a calibration/background reference 58. The calibration/background reference 58 can be scanned by the first optical module 20 before the scan operation starts to perform a calibration process of the scanning apparatus, or during the scan operation to determine a size of the original sheet O. In addition, the fixed end portion 54 mounted on the adapter 74 further includes an inner plane 57 which is reverse to the outer plane 56 of the fixed end portion 54. The inner plane 57 is adhered to a flat lower surface 74L of the adapter 74. Therefore, the elastic pressing member 50 of this embodiment provides the essential elements for the purposes of sheet pressing, calibration and size detection collectively.

Figure 7:
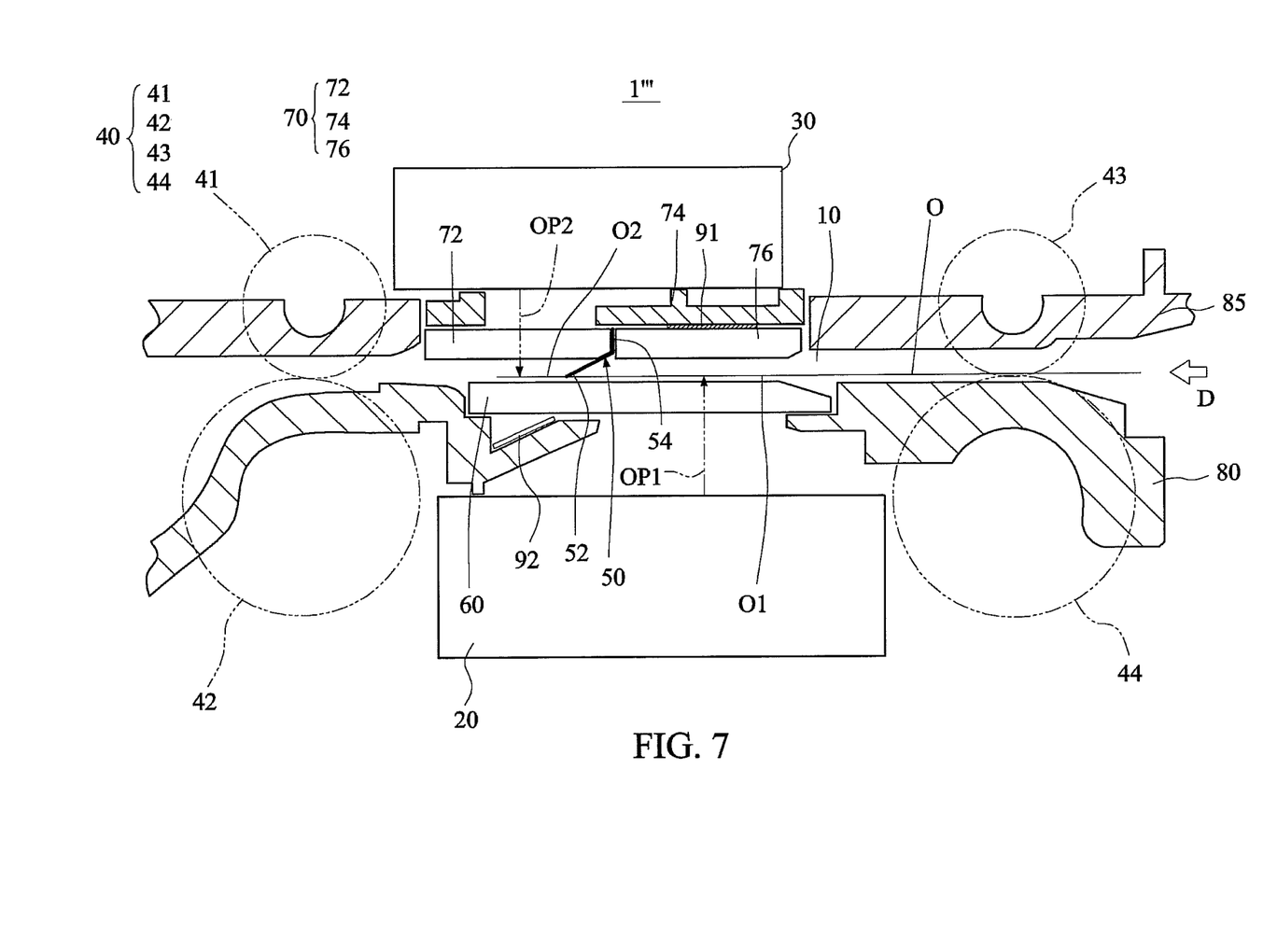
FIG. 7 is a partial view of the duplex scanning apparatus according to a fourth embodiment of the present invention.

FIG. 7 is a partial view of the duplex scanning apparatus 1''' according to a fourth embodiment of the present invention. As shown in FIG. 7, this embodiment is similar to the first embodiment except that the guiding structure 70 includes the second transparent substrate 72 and a third transparent substrate 76 disposed at the first scan position OP1. The fixed end portion 54 of the elastic pressing member 50 is mounted between the second transparent substrate 72 and the third transparent substrate 76. It is to be noted that the adapter 74 may also be regarded as a part of the guiding structure 70, and the first calibration sheet 91 is disposed between the third transparent substrate 76 and the adapter 74.

The duplex scanning apparatus is capable of scanning original sheets of various thicknesses, where the elastic pressing member presses the original sheet to prevent deviation of the original sheet in the passageway and to reduce the impact of sheet curl on the scan image quality, such that no image distortion will occur.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A duplex scanning apparatus, comprising:
    a passageway;
    a first optical module disposed on one side of the passageway;
    a second optical module disposed on the other side of the passageway;
    a transporting mechanism for transporting an original sheet through the passageway and past a first scan position of the first optical module and a second scan position of the second optical module, such that an image of a front side of the original sheet and an image of a reverse side of the original sheet are obtained;
    an elastic pressing member, disposed between the first scan position and the second scan position, for pushing the original sheet towards an original supporting plane; and
    a guiding structure, which is disposed on one of the two sides of the passageway, wherein a fixed end portion of the elastic pressing member is mounted to the guiding structure, and the fixed end portion is disposed between the first scan position and the second scan position.

2. The duplex scanning apparatus according to claim 1, wherein the original supporting plane is disposed opposite to the guiding structure.

3. The duplex scanning apparatus according to claim 2, further comprising a first transparent substrate, wherein the original supporting plane is formed by an upper surface of the first transparent substrate and the elastic pressing member presses the original sheet against the first transparent substrate.

4. The duplex scanning apparatus according to claim 1, wherein the guiding structure comprises:
    a second transparent substrate; and
    a calibration sheet carrier disposed at the first scan position, wherein the fixed end portion of the elastic pressing member is mounted between the second transparent substrate and the calibration sheet carrier.

5. The duplex scanning apparatus according to claim 1, wherein the guiding structure comprises:
    a second transparent substrate; and
    an adapter, wherein the fixed end portion of the elastic pressing member is mounted between the second transparent substrate and the adapter.

6. The duplex scanning apparatus according to claim 1, wherein the guiding structure comprises:
    a second transparent substrate; and
    an adapter, wherein the fixed end portion of the elastic pressing member is attached to the adapter at the first scan position and has an outer plane facing the original supporting plane, and a free end portion of the elastic pressing member bends towards the original supporting plane.

7. The duplex scanning apparatus according to claim 6, wherein the outer plane of the fixed end portion is formed with a calibration reference and the first optical module scans the calibration reference for performance of a calibration process.

8. The duplex scanning apparatus according to claim 6, wherein the outer plane of the fixed end portion is formed with a background reference and the first optical module scans the background reference for determination of a size of the original sheet.

9. The duplex scanning apparatus according to claim 6, wherein an inner plane reverse to the outer plane of the fixed end portion is adhered to a flat lower surface of the adapter.

10. The duplex scanning apparatus according to claim 1, wherein the guiding structure comprises:
    a second transparent substrate; and
    a third transparent substrate disposed at the first scan position, wherein the fixed end portion of the elastic pressing member is disposed between the second transparent substrate and the third transparent substrate.

11. The duplex scanning apparatus according to claim 1, wherein:
    the guiding structure comprises a second transparent substrate which has an upper surface and an adjacent side surface, wherein the side surface is located between the first scan position and the second scan position; and
    the elastic pressing member is bent and comprises a first section fixed to the upper surface of the second transparent substrate, a connected second section fixed to the side surface of the second transparent substrate, and a free end portion.

12. The duplex scanning apparatus according to claim 1, further comprising a first body and a second body, which are movable relatively to each other to change a clearance width of the passageway, wherein the first optical module is disposed in the first body and the second optical module is disposed in the second body.

* * * * *